(12) United States Patent
Choi (10) Patent No.: US 10,889,279 B2
(45) Date of Patent: Jan. 12, 2021

(54) MASTER CYLINDER OF VEHICLE BRAKE

(71) Applicant: HYUNDAI MOBIS Co., Ltd., Seoul (KR)

(72) Inventor: Byeong Jin Choi, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 0 days.

(21) Appl. No.: 16/671,124

(22) Filed: Oct. 31, 2019

(65) Prior Publication Data

US 2020/0391717 A1 Dec. 17, 2020

(30) Foreign Application Priority Data

Jun. 12, 2019 (KR) .................. 10-2019-0069350

(51) Int. Cl.
*B60T 13/74* (2006.01)

(52) U.S. Cl.
CPC .................. *B60T 13/745* (2013.01)

(58) Field of Classification Search
CPC .................. F15B 7/08; B60T 13/745
USPC .................. 60/545
See application file for complete search history.

(56) References Cited

U.S. PATENT DOCUMENTS

| | | | | |
|---|---|---|---|---|
| 5,667,283 A * | 9/1997 | Drennen | ............ | B60T 8/00 303/115.2 |
| 6,230,492 B1 * | 5/2001 | Kingston | ............ | B60T 13/745 60/545 |
| 6,574,959 B2 * | 6/2003 | Fulks | ............ | B60T 13/745 60/545 |
| 9,109,463 B2 * | 8/2015 | Lee | ............ | F01D 25/162 |
| 10,250,098 B2 * | 4/2019 | Leiber | ............ | H02K 11/22 |
| 10,507,817 B2 * | 12/2019 | Shigeta | ............ | B60T 13/745 |
| 2018/0001881 A1 * | 1/2018 | Huang | ............ | F16H 35/18 |
| 2019/0100188 A1 * | 4/2019 | Lee | ............ | B60T 13/745 |
| 2020/0010067 A1 * | 1/2020 | Lee | ............ | B60T 11/236 |

FOREIGN PATENT DOCUMENTS

| | | |
|---|---|---|
| JP | 2012-214069 | 11/2012 |
| KR | 10-2010-0098831 | 9/2010 |
| KR | 10-2016-0095486 | 8/2016 |
| KR | 10-2019-0037942 | 4/2019 |

* cited by examiner

*Primary Examiner* — Michael Leslie
(74) *Attorney, Agent, or Firm* — H.C. Park & Associates, PLC (57) ABSTRACT

A master cylinder of a vehicle brake includes a housing, a motor, a screw, a moving piston, a guide, and a pressurizing part. The housing includes a port configured to move hydraulic fluid. The motor is connected to the housing and configured to supply rotation power. The screw is rotatably installed in the motor and configured to rotate in response to the rotation power. The moving piston is engaged with an outside of the screw, and is configured to move in a longitudinal direction of the housing in response to rotation of the screw. The guide is blocked by the housing and constrained from rotating, and is configured to constrain rotation of the moving piston and guide linear movement of the moving piston in the longitudinal direction. The pressurizing part is installed between the housing and the guide, and is configured to pressurize the guide via an elastic force.

10 Claims, 7 Drawing Sheets

MASTER CYLINDER OF VEHICLE BRAKE

CROSS-REFERENCE TO RELATED APPLICATION

This application claims priority from and the benefit of Korean Patent Application No. 10-2019-0069350, filed Jun. 12, 2019, which is hereby incorporated by reference for all purposes as if fully set forth herein.

BACKGROUND

Field

Exemplary embodiments generally relate to a master cylinder of a vehicle brake, and, more particularly, to a master cylinder of a vehicle brake that can easily manage a pre-load and tolerance between assembled parts through an elastic body, and, thereby, improve operation reliability.

Discussion

In general, a master cylinder of a vehicle brake generates a braking force for restraining movement of wheels of a vehicle using hydraulic pressure, which is generated in response to a piston in the master cylinder being moved. When a driver steps on a pedal, braking pressure is decided. Therefore, the master cylinder is operated to implement the braking pressure, and the hydraulic pressure generated by the master cylinder is transferred to each of the wheels. Since the master cylinder is typically operated by hydraulic pressure, difficulty arises in precisely moving the piston to implement the braking pressure. In order to address (or solve) such an issue, a method for moving a piston using rotation power of a motor has been suggested, such as in Korean Patent Application No. 10-2016-0095486, laid-open on Aug. 11, 2016, and entitled "Master Cylinder for Brake of Vehicle." However, since tolerance between assembled parts is not normally managed, friction and interference between the parts may occur. Therefore, there is a need for a structure capable of solving such issues.

The above information disclosed in this section is only for understanding the background of the inventive concepts, and, therefore, may contain information that does not form prior art.

SUMMARY

Some exemplary embodiments are directed to a master cylinder of a vehicle brake capable of easily managing a pre-load and tolerance between assembled parts through an elastic body, and, thereby, improve operation reliability.

Additional aspects will be set forth in the detailed description which follows, and, in part, will be apparent from the disclosure, or may be learned by practice of the inventive concepts.

According to some exemplary embodiments, a master cylinder of a vehicle brake is includes a housing, a motor, a screw, a moving piston, a guide, and a pressurizing part. The housing includes a port configured to move hydraulic fluid. The motor is connected to the housing and configured to supply rotation power. The screw is rotatably installed in the motor and configured to rotate in response to the rotation power of the motor. The moving piston is engaged with an outside of the screw, and is configured to move in a longitudinal direction of the housing in response to rotation of the screw. The guide is blocked by the housing and constrained from rotating, and is configured to constrain rotation of the moving piston and guide linear movement of the moving piston in the longitudinal direction. The pressurizing part is installed between the housing and the guide, and is configured to pressurize the guide via an elastic force.

In some exemplary embodiments, the motor may include a fixed part, a motor rotating part, and a motor bearing part. The fixed part may be fixed to the housing and may be configured to change magnetism in response to a supplied power. The motor rotating part may be connected to the screw. The motor rotating part may be configured to rotate with the screw and rotate according to the change in the magnetism of the fixed part. The motor bearing part may be installed between the fixed part and the motor rotating part. The motor bearing part may be configured to reduce friction associated with rotation of the motor rotating part.

In some exemplary embodiments, the motor rotating part may include a rotating frame and a rotor. The rotating frame may be rotatably installed in the fixed part. A shape of the rotating frame may cover an end of the moving piston. The rotor may be installed outside the rotating frame and facing the fixed part. The rotor may include magnetism.

In some exemplary embodiments, the screw may include a screw body and a screw rotating shaft. The screw body may be rotatably installed in the rotating frame. The screw may include a spiral gear formed on the outside of the screw. The screw rotating shaft may be extended from the screw body and may be spline-coupled to the rotating frame.

In some exemplary embodiments, a compensation clearance may be provided between the rotating frame and the screw rotating shaft.

In some exemplary embodiments, the pressurizing part may be a plate spring comprising a curved cross-section, and may be configured to pressurize the guide in a direction away from the moving piston.

According to some exemplary embodiments, a master cylinder of a vehicle brake includes a housing, a motor, a screw, a ball member, and a support part. The housing includes a port configured to transmit hydraulic fluid. The motor is connected to the housing and is configured to supply rotation power. The screw is rotatably installed in the motor, and is configured to rotate in response to the rotation power of the motor. The ball member is connected to a screw rotating shaft of the screw, and includes a curved surface. The support part is positioned on opposing sides of the ball member, and rotatably supports the ball member.

In some exemplary embodiments, the support part may include a first support member and a second support member. The first support member may be positioned in the motor and the screw rotating shaft may include a portion extending through the first support member. The second support member may be installed at a position facing the first support member.

In some exemplary embodiments, the first and second support members may be configured to rotate together with the screw rotating shaft.

In some exemplary embodiments, the master cylinder of a vehicle may further include a thrust bearing part installed at a position facing the second support member. The thrust bearing part may be being configured to reduce friction associated with rotation of the second support member.

According to various exemplary embodiments, a pressurizing part implemented as an elastic body may elastically pressurize a guide body in a direction that a support part is installed in a master cylinder, and, as such, may apply a pre-load between assembled parts of the master cylinder. In this manner, tolerance management can be easily performed, and friction and interference between the parts can be reduced.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the X-axis, the Y-axis, and the Z-axis are not limited to three axes of a rectangular coordinate system, and may be interpreted in a broader sense. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, various exemplary embodiments of a master cylinder of a vehicle brake will be described with reference to the accompanying drawings.

Figure 1:
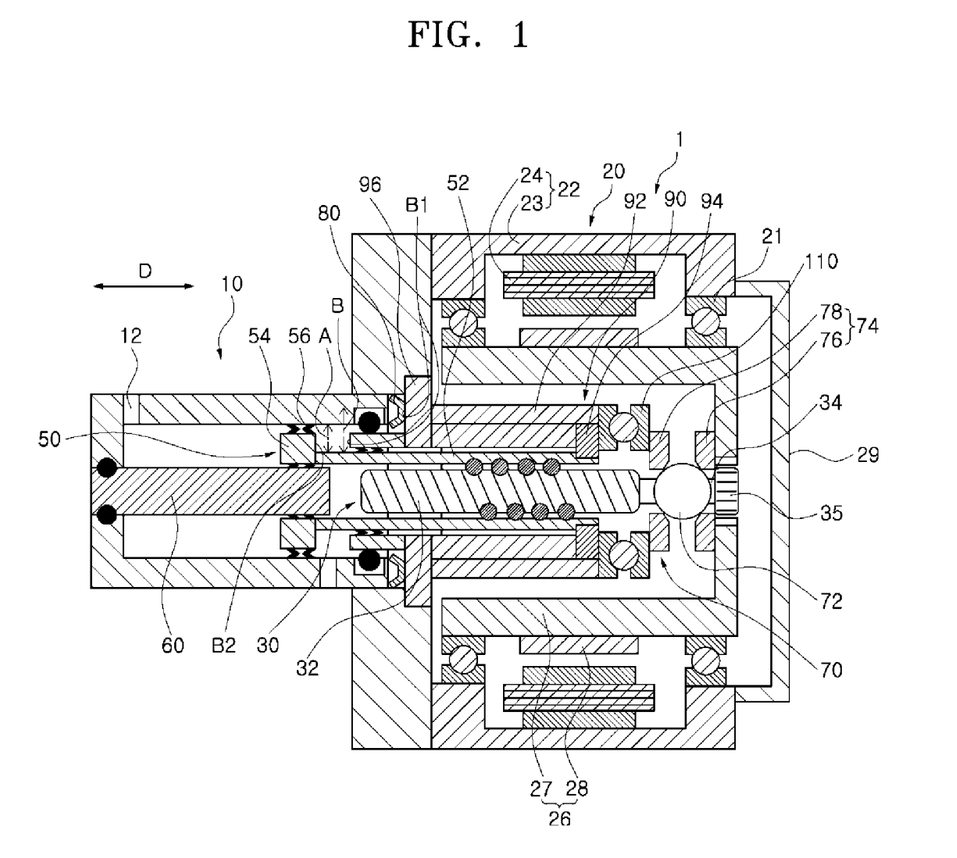
FIG. 1 is a cross-sectional view schematically illustrating a structure of a master cylinder of a vehicle brake according to some exemplary embodiments.
Figure 2:
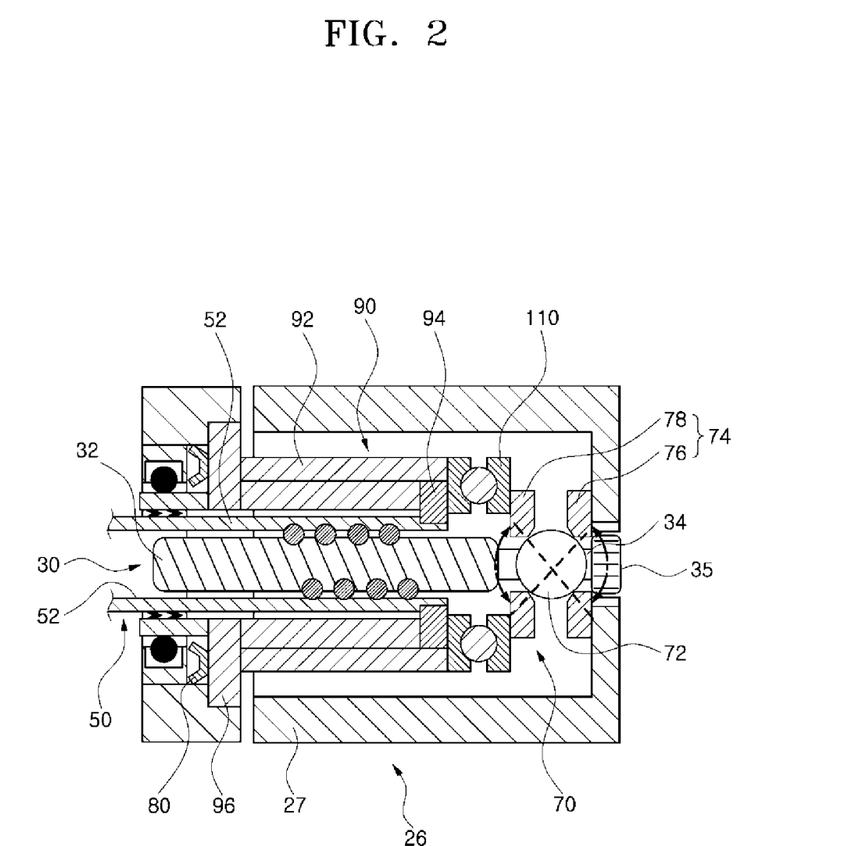
FIG. 2 is a cross-sectional view illustrating a screw in the structure of FIG. 1 configured to compensate for a deflection angle while rotated about a ball member according to some exemplary embodiments.
Figure 3:
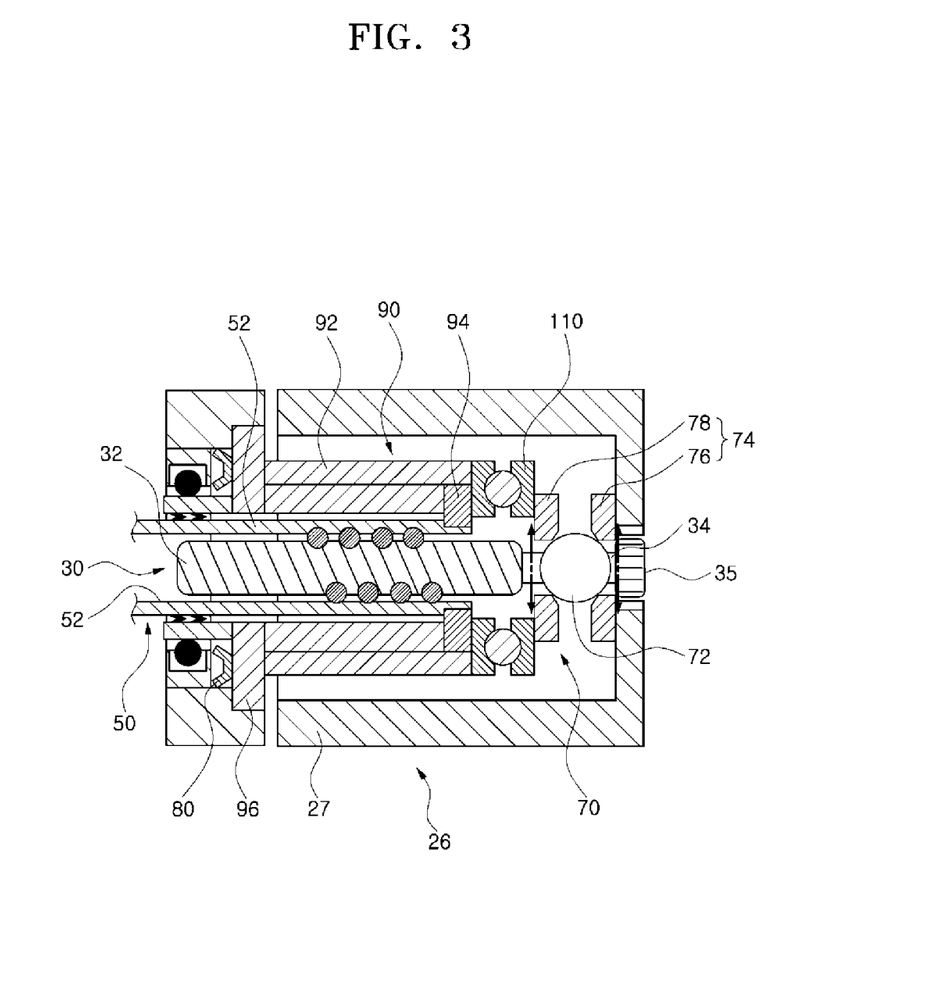
FIG. 3 is a cross-sectional view illustrating a screw in the structure of FIG. 1 configured to compensate for eccentricity while moved in a top-to-bottom direction according to some exemplary embodiments.
Figure 4:
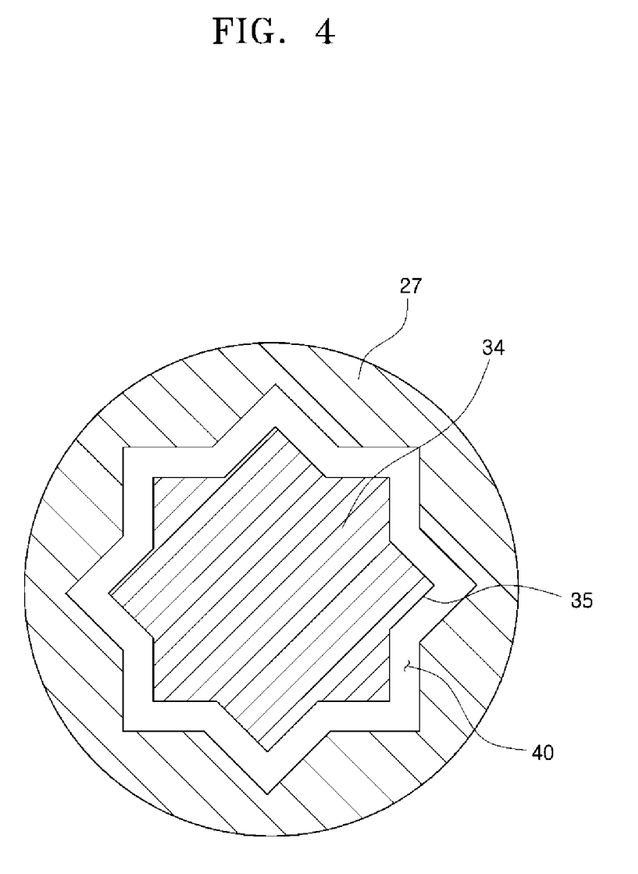
FIG. 4 is a diagram illustrating that a compensation clearance is formed between a side protrusion and a rotating frame according to some exemplary embodiments.
Figure 5:
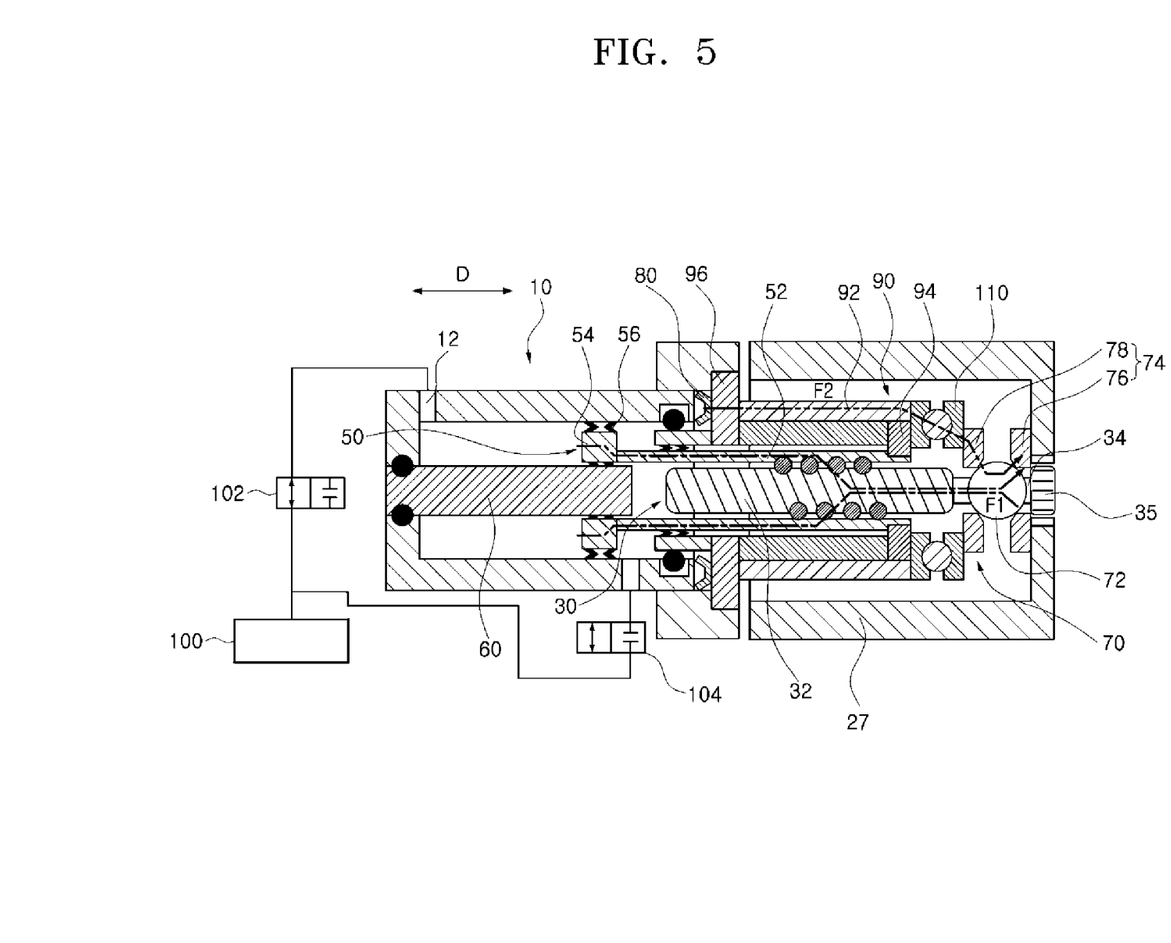
FIG. 5 is a cross-sectional view illustrating that hydraulic pressure is generated on one side of a piston member according to some exemplary embodiments.
Figure 6:
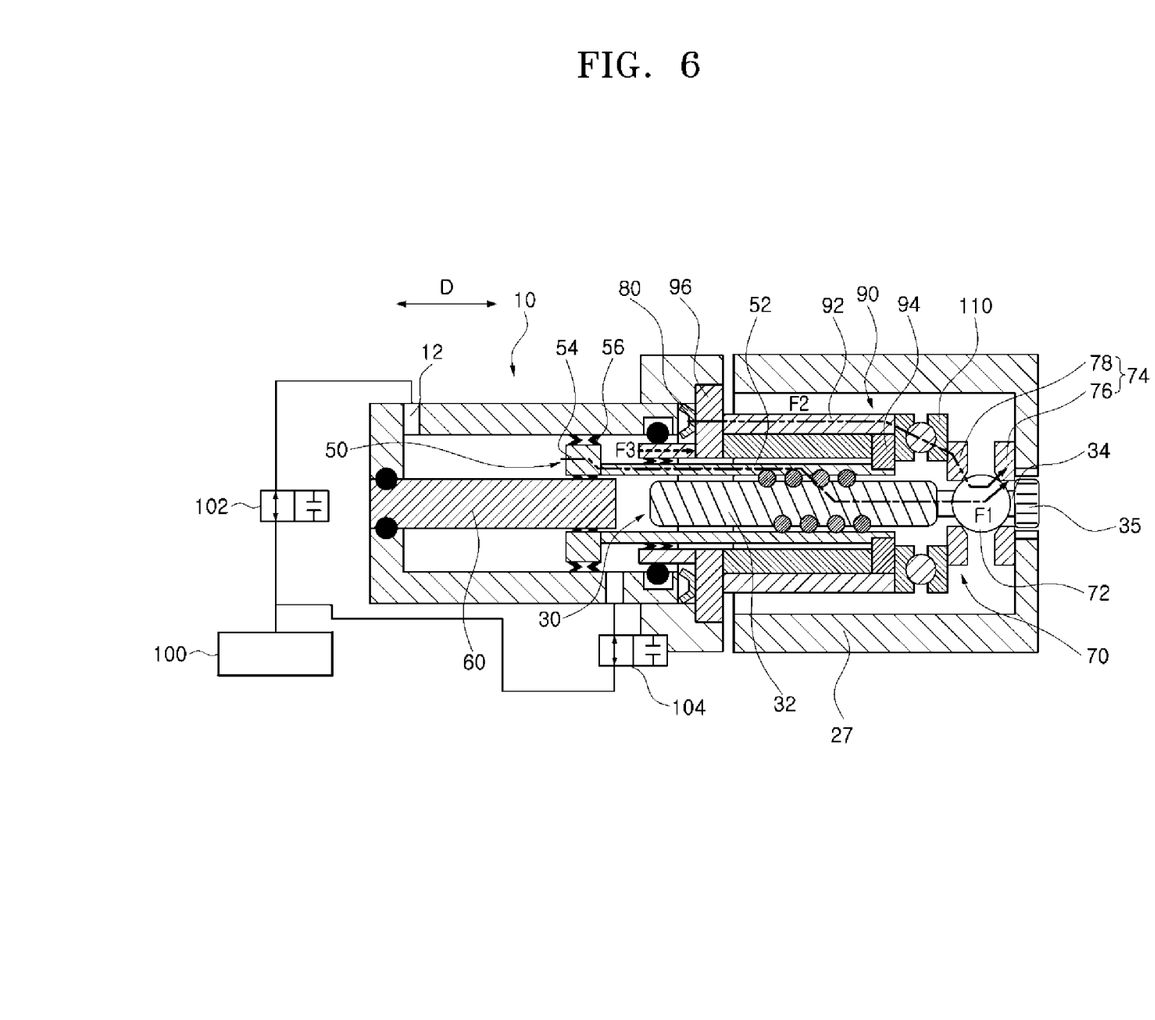
FIG. 6 is a cross-sectional view illustrating that hydraulic pressure is generated on both sides of a piston member according to some exemplary embodiments.
Figure 7:
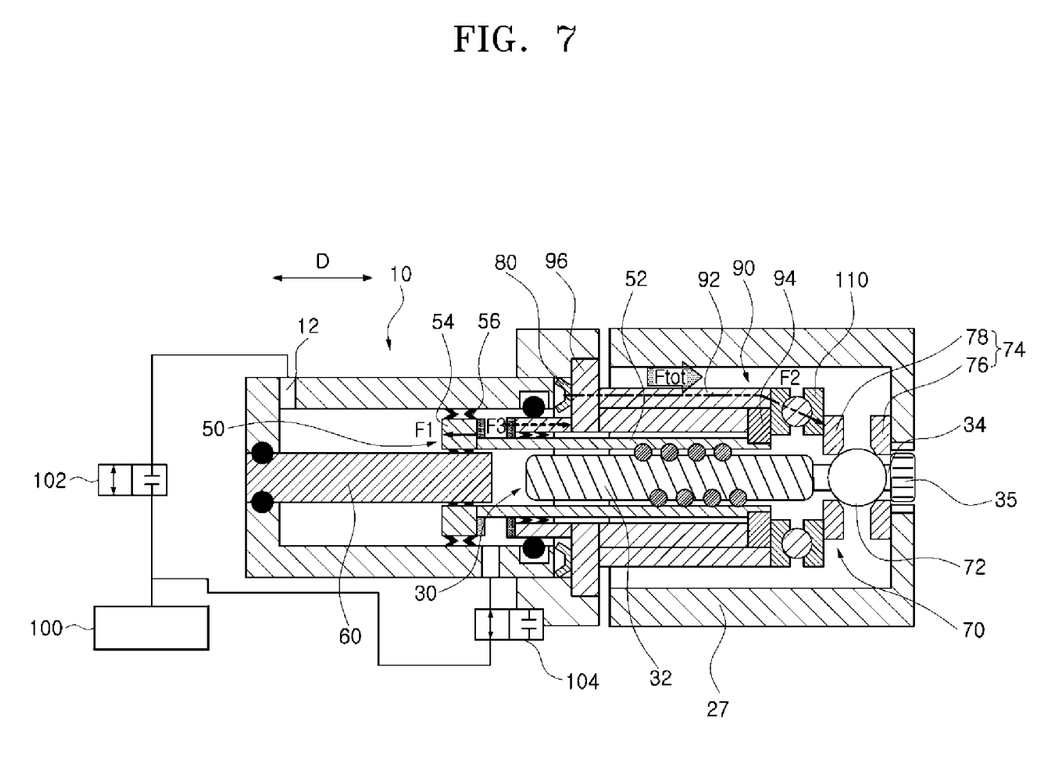
FIG. 7 is a cross-sectional view illustrating that hydraulic pressure is generated on the other side of a piston member according to some exemplary embodiments.

FIG. 1 is a cross-sectional view schematically illustrating a structure of a master cylinder of a vehicle brake according to some exemplary embodiments. FIG. 2 is a cross-sectional view illustrating a screw in the structure of FIG. 1 configured to compensate for a deflection angle while rotated about a ball member according to some exemplary embodiments. FIG. 3 is a cross-sectional view illustrating a screw in the structure of FIG. 1 configured to compensate for eccentricity while moved in a top-to-bottom direction according to some exemplary embodiments. FIG. 4 is a diagram illustrating that a compensation clearance is formed between a side protrusion and a rotating frame according to some exemplary embodiments. FIG. 5 is a cross-sectional view illustrating that hydraulic pressure is generated on one side of a piston member according to some exemplary embodiments. FIG. 6 is a cross-sectional view illustrating that hydraulic pressure is generated on both sides of a piston member according to some exemplary embodiments. FIG. 7 is a cross-sectional view illustrating that hydraulic pressure is generated on the other side of a piston member according to some exemplary embodiments.

Referring to FIG. 1, a master cylinder 1 of a vehicle brake according to some exemplary embodiments includes a housing 10, a motor 20, a screw 30, a moving piston 50, a guide 90, and a pressurizing part 80. The housing 10 has a port 12 through which a fluid (e.g., gas, oil, or the like) is moved. For descriptive convenience, the fluid will, hereinafter, be described as oil. The motor 20 is connected to the housing 10 and supplies rotation power. The screw 30 is rotatably installed in the motor 20 and is rotated by the rotation power received from the motor 20. The moving piston 50 is engaged with the outside of the screw 30 and moved in the longitudinal direction D of the housing 10 by the rotation of the screw 30. The guide 90 is blocked by the housing 10 and constrained from rotating, and guides the moving piston 50 to linearly move in the longitudinal direction D while constraining the rotation of the moving piston 50. The pressurizing part 80 is installed between the housing 10 and the guide 90 and pressurizes the guide 90 using an elastic force.

A driver's operation to step on a pedal decides (e.g., determines, regulates, etc.) braking pressure. Therefore, the master cylinder 1 of a vehicle brake is operated to implement the braking pressure, and the generated hydraulic pressure is transferred to each wheel of a vehicle.

The master cylinder 1 of a vehicle brake according to some exemplary embodiments provides a pre-pressure management assembly structure among assembled parts of the motor 20, the screw 30, the moving piston 50, and the guide 90. Thus, the master cylinder 1 can reduce tolerance between the assembling parts while improving the degree of freedom in design, and, thereby, reduce manufacturing cost. Furthermore, when the master cylinder 1 of a vehicle brake is driven, active shaft alignment compensation and abrasion gap compensation can be achieved to improve the durability and the system efficiency, and to reduce noise and vibration.

The port 12 of the housing 10, through which oil is moved, is formed on either side of the housing 10 in the longitudinal direction D, and the housing 10 has an internal operation space in which a piston member 54 of the moving piston 50 is moved. Oil moved by the movement of the piston member 54 implements the braking pressure associated with the operation of the pedal while being moved through the port 12.

As long as the motor 20 is connected to the housing 10 and supplies rotation power, various types of driving devices may be used as the motor 20. The motor 20 according to some exemplary embodiments includes a motor bearing part 21, a fixed part 22, and a motor rotating part 26.

The fixed part 22 may be formed in various shapes, as long as the fixed part 22 is fixed to the housing 10 and magnetism is changed by power supply. The fixed part 22 according to some exemplary embodiments includes a fixed frame 23 fixed to one side of the housing 10 and a stator 24 installed in the fixed frame 23 facing the motor rotating part 26 and configured to generate magnetism.

The fixed frame 23 is connected to one side of the housing 10, and the motor rotating part 26 is rotatably installed in the fixed frame 23. Furthermore, the stator 24 is configured as an electromagnet and is installed in the fixed frame 23 in a circumferential direction. The stator 24 rotates the motor rotating part 26 while magnetic fluxes are changed by a control signal of a control unit (not shown).

The motor rotating part 26 can be modified in various shapes, as long as the motor rotating part 26 is connected to the screw 30, rotates with the screw 30, and rotates according to a change in magnetism of the fixed part 22. The motor rotating part 26 according to some exemplary embodiments includes a rotating frame 27 and a rotor 28. The rotating frame 27 is rotatably installed in the fixed frame 23 and installed in a shape to cover an end of the moving piston 50. The rotor 28 is installed outside the rotating frame 27 facing the fixed part 22 and has magnetism.

The motor rotating part 26 according to some exemplary embodiments has a U-shaped cross-section, and is formed in a hollow shape. In some exemplary embodiments, the motor rotating part 26 is formed in a solid core type, and geared with the outside of a separate shaft whose rotation is constrained by the motor rotating part 26. Therefore, when the solid core-type motor rotating part 26 is rotated, the shaft may move the piston member 54 while linearly moved, thereby generating hydraulic pressure.

The motor bearing part 21 is installed between the fixed part 22 and the motor rotating part 26, and reduces friction that occurs when the motor rotating part 26 is rotated. The rotor 28 including a plurality of magnets installed in the circumferential direction of the rotating frame 27 is rotated with the rotating frame 27 by the change in magnetism of the stator 24.

A cover member 29 is fixed to the fixed frame 23 and installed in a shape to cover the outside of an end of the rotating frame 27. As such, the cover member 29 blocks introduction of foreign matter.

The screw 30 may be formed in various shapes, as long as the screw 30 is rotatably installed in the motor 20 and rotated by the rotation power received from the motor 20. The screw 30 according to some exemplary embodiments includes a screw body 32 and a screw rotating shaft 34. The screw body 32 is rotatably installed in the rotating frame 27 and has a spiral gear formed on the outside thereof. The screw rotating shaft 34 is extended from the screw body 32 and spline-coupled to the rotating frame 27.

The screw rotating shaft 34 extended outward from the rotation center of the screw body 32 has a smaller diameter than the screw body 32. As illustrated in FIG. 4, a plurality of side protrusions 35 protrude from the outside of the screw rotating shaft 34 facing the rotating frame 27. Thus, the rotating frame 27 and the screw 30 are spline-coupled to transfer power.

Furthermore, a compensation clearance 40 is provided between the rotating frame 27 and the screw rotating shaft 34. The side protrusions 35 formed on the screw 30 and the rotating frame 27 are spaced apart from each other by a preset distance, thereby forming the compensation clearance 40. Therefore, a degree of freedom is secured for the screw 30 and a compensator 70 to move in a top-to-bottom direction, such as shown in FIG. 3. Therefore, it is possible to compensate for coaxiality among the housing 10, the screw 30, and the motor 20 when the master cylinder 1 of a vehicle brake is assembled.

With continued reference to FIG. 1, the moving piston 50 may be formed in various shapes, as long as the moving piston 50 is engaged with the outside of the screw 30, and moved in the longitudinal direction D of the housing 10 by the rotation of the screw 30. The moving piston 50 according to some exemplary embodiments includes a moving body 52, the piston member 54, and a sealing member 56.

The moving body 52 is installed in a shape to cover the outside of the screw body 32, and linearly moved by the rotation of the screw body 32. The moving body 52 has one side positioned in the motor rotating part 26 and the other side positioned in the housing 10.

The piston member 54 is connected to the moving body 52 extended into the housing 10, and moves oil between the housing 10 and a fixed piston 60 toward the port 12. The piston member 54 is formed in a ring shape, and fixed to the outside of the other end of the moving body 52. The piston member 54 and the moving body 52 may be formed as one body, or separately manufactured and then assembled to each other.

When the piston member 54 and the moving body 52 are formed as one body, a process of assembling the piston member 54 and the moving body 52 is removed, and the axial length of the master cylinder 1 of a vehicle brake can be reduced. Therefore, a reduction in the number of parts, a reduction in the number of assembling processes, and a reduction in an axial length of the master cylinder 1 of a vehicle brake can improve system packaging efficiency. The sealing member 56 is installed on a side surface of the moving body 52 and a side surface of the piston member 54, and moved with the moving body 52.

The fixed piston 60 may be formed in various shapes, as long as the fixed piston 60 is fixed to the inside of the housing 10 and the moving piston 50 is positioned outside the fixed piston 60. The fixed piston 60 according to some exemplary embodiments is positioned on the same axial line as the screw 30, and the fixed piston 60 has one side positioned in the moving piston 50 and the other side fixed to the housing 10. The fixed piston 60 according to some exemplary embodiments is formed in a cylindrical shape, and the rotation centers of the fixed piston 60, the screw 30, and the motor rotating part 26 are positioned on the same axial line.

The compensator 70 may be formed in various shapes, as long as the compensator 70 is installed in the rotating frame 27 and compensates for the coaxiality of the rotating frame 27 and the screw 30. The compensator 70 in accordance some exemplary embodiments includes a ball member 72 and a support part 74.

The ball member 72 is connected to the screw rotating shaft 34 of the screw 30 positioned in the rotating frame 27 and has a spherical surface. The support part 74 is positioned on either side of the ball member 72, and rotatably supports the ball member 72. The support part 74 in accordance some exemplary embodiments includes a first support member 76 and a second support member 78. The first support member 76 is positioned in the rotating frame 27 such that the screw rotating shaft 34 is disposed therethrough, and the second support member 78 is installed at a position facing the first support member 76.

The ball member 72 may be formed in any one shape of a hemisphere and a sphere. In addition, various members with a spherical shape may be used as the ball member 72. Two or more positions of the ball member 72 are supported by the support part 74. Both sides of the ball member 72 in accordance some exemplary embodiments are supported by the first support member 76 and the second support member 78.

The first support member 76 is positioned between the ball member 72 and the side protrusions 35, and is installed in contact with the inner surface of the rotating frame 27 facing the ball member 72. Since the first support member 76 facing the ball member 72 has a concave groove, the first support member 76 may rotatably support the ball member 72 with the second support member 78.

The second support member 78 is installed at a position facing the first support member 76 with the ball member 72 interposed therebetween, and is rotatably installed through a thrust bearing part 110. Since the second support member 78 facing the ball member 72 also has a concave groove, the second support member 78 may rotatably support the ball member 72 with the first support member 76. The first support member 76 and the second support member 78 according to some exemplary embodiments may be rotated with the screw rotating shaft 34.

The pressurizing part 80 is installed between the housing 10 and the guide 90, and pressurizes the guide 90 using an elastic force to apply a pre-load. The pressurizing part 80 according to some exemplary present embodiments is a plate spring having a curved cross-section, and pressurizes the guide 90 in the direction that the first support member 76 is installed. Since the pressurizing part 80 pressurizes the guide 90 in a direction away from the moving piston 50, a pre-load may be applied when parts are assembled.

Two or more positions of the ball member 72 are supported by the support part 74, and the ball member 72 contacted with the support part 74 forms a curved surface at one or more positions. Since the ball member 72 has an alignment structure positioned between the first support member 76 and the second support member 78, a load transferred from the pressurizing part 80 to the ball member 72 may be reduced to facilitate an operation of aligning and assembling parts.

The pressurizing part 80 is installed on a sidewall of the housing 10 facing the guide 90, and elastically pressurizes the guide 90 toward the other side (right in FIG. 1) of the housing 10.

The pressurizing part 80 implemented with a plate spring may include a wave washer. The pressurizing part 80 may be modified in various shapes. For example, the pressurizing part 80 may be implemented as an elastic member having a curved cross-section. The wave washer is a washer in which the functions of a flat washer and a spring washer are combined, and serves to prevent relaxation while distributing surface pressure. Furthermore, a rubber O-ring may be used as the pressurizing part 80, and the pressurizing part 80 can be modified in various manners. For example, a member including at least one of silicone, synthetic resin, and rubber can be used as the pressurizing part 80.

The guide 90 may be formed in various shapes, as long as the guide 90 is blocked by the housing 10 and constrained from rotating, and constrains the rotation of the moving piston 50 and guides the moving piston 50 to linearly move in the longitudinal direction D. In some exemplary embodiments, the guide 90 includes a guide body 92, a wing member 94, and a fixed protrusion 96.

The guide body 92 has a groove in which the wing member 94 is inserted so as to move in the longitudinal direction D. The guide body 92 is positioned outside the moving piston 50, and the fixed protrusion 96 extended from the guide body 92 is fixedly installed on the housing 10. Since the fixed protrusion 96 is installed at a position facing the pressurizing part 80, the fixed protrusion 96 is pushed by the pressurizing part 80 and pressurized toward the other side of the housing 10.

The wing member 94 is fixed to the outside of the moving body 52, formed in a shape to protrude to the outside of the moving body 52, and moved with the moving body 52. One side of the wing member 94 is fixed to the moving body 52, and the other side is inserted into the guide body 92.

The rotation of the wing member 94 fixed to the moving body 52 of the moving piston 50 is constrained by the guide body 92 when the screw 30 is rotated. Thus, the moving body 52 may serve to decide the position of the piston member 54 while linearly moved. That is, to implement braking pressure of a driver, the motor 20 rotates the screw 30, and, thus, the moving body 52 is linearly moved to decide the position of the piston member 54. Therefore, the magnitude of the braking pressure of the master cylinder 1 of a vehicle brake is controlled, and the sealing member 56, the fixed piston 60, and the housing 10 that are assembled to the respective components seal the space in which the braking pressure is formed.

The thrust bearing part 110 is installed between the second support member 78 and the guide 90, and serves to reduce friction, which occurs when the second support member 78 is rotated.

Hereafter, an exemplary operation of the master cylinder 1 of a vehicle brake according to some exemplary embodiments will be described in more detail with reference to the accompanying drawings.

When the magnetism of the stator 24 is changed to implement a braking pressure of the driver, the motor rotating part 26 is rotated with the rotor 28. The motor rotating part 26 rotates the spline-coupled screw 30, and the rotation of the screw 30 linearly moves the moving piston 50 in the longitudinal direction D of the housing 10.

In addition to the coupling structure in which the screw rotating shaft 34 is spline-coupled to the rotating frame 27, the screw rotating shaft 34 may be connected to the rotating frame 27 by connection of a power transmission member. As the power transmission member, various types of connection members may be used, including a gear, key, and coupler for connecting the screw rotating shaft 34 to the rotating frame 27.

The moving piston 50 facing the screw 30 is allowed only to linearly move because the wing member 94 protruding to the outside of the moving piston 50 is inserted into the guide body 92 and constrained from rotating.

The braking pressure is formed by the movement of the moving piston 50 having the piston member 54, and oil for forming the braking pressure is moved through the port 12.

The master cylinder 1 of a vehicle brake according to various exemplary embodiments is configured to compensate for axial alignment among the center axis of the motor 20, the center axis of the screw 30, and the center axis of the moving piston 50. When the compensation for the axial alignment among the center axes of the respective parts is desired, the parts may be rotated about the ball member 72 as illustrated in FIG. 2, which makes it possible to compensate for a deflection angle between the assembled parts. Furthermore, as illustrated in FIG. 3, the screw 30 may be moved in the top-to-bottom direction to compensate for eccentricity.

Furthermore, a pre-load of a part assembled between the pressurizing part 80 and the first support member 76 may be managed through the pressurizing part 80 and the guide body 92 implemented as a slidable structure. Since the pre-load value can be managed through the pressurizing part 80 implemented as an elastic body, tolerance between assembled parts can be reduced, and a degree of freedom in design can be obtained. Furthermore, design values for the compensation for the deflection angle and the eccentricity can be examined and effectively managed.

As illustrated in FIG. 5, a first valve 102 connected to the port 12 formed on one side of the housing 10 may be opened, and a second valve 104 connected to the port 12 formed on the other side of the housing 10 may be closed. In this state, hydraulic pressure is formed only on one side (e.g., left side in FIG. 5) of the piston member 54, and transferred to a wheel brake 100.

Accordingly, pressure formed by the hydraulic pressure forms a first force F1 while the force is transferred in order of the piston member 54, the moving body 52, the screw body 32, the ball member 72, and the first support member 76. Furthermore, the elastic force of the pressurizing part 80 forms a second force F2 while the force is transferred in order of the fixed protrusion 96, the guide body 92, the thrust bearing part 110, the ball member 72 and the first support member 76. Therefore, since the respective parts are pressed against each other by the first and second forces F1 and F2, it is possible to prevent generation of noise or vibration by tolerance between the parts.

As illustrated in FIG. 6, the first valve 102 connected to the port 12 formed on the one side of the housing 10 may be opened, and the second valve 104 connected to the port 12 formed on the other side of the housing 10 may also be opened. In this state, hydraulic pressure is formed on both sides of the piston member 54, and transferred to the wheel brake 100.

At this time, pressure formed by the hydraulic pressure forms a first force F1 while the force is transferred in order of the piston member 54, the moving body 52, the screw body 32, the ball member 72 and the first support member 76. Furthermore, the elastic force of the pressurizing part 80 forms a second force F2 while the force is transferred in order of the fixed protrusion 96, the guide body 92, the thrust bearing part 110, the ball member 72, and the first support member 76. Furthermore, hydraulic pressure generated by the chamber positioned on the other side (e.g., the right side in FIG. 6) of the piston member 54 forms a third force F3 to pressurize the guide body 92 toward the other side of the piston member 54.

Therefore, since the respective parts are pressed against each other by the first to third forces F1 to F3, it is possible to prevent (or at least reduce) generation of noise or vibration by tolerance between the parts.

As illustrated in FIG. 7, the first valve 102 connected to the port 12 formed on the one side of the housing 10 may be closed, and the second valve 104 connected to the port 12 formed on the other side of the housing 10 may be opened. In this state, hydraulic pressure is formed only on the other side (e.g., right side in FIG. 7) of the piston member 54, and is transferred to the wheel brake 100.

Accordingly, pressure formed by the hydraulic pressure forms a first force F1 to move the piston member 54 toward one side (e.g., the left side in FIG. 7) of the housing 10, and the elastic force of the pressurizing part 80 forms a second force F2 to pressurize the guide 90 to the other side of the housing 10, while the force is transferred in order of the fixed protrusion 96, the guide body 92, the thrust bearing part 110, the ball member 72, and the first support member 76.

The hydraulic pressure of the chamber positioned on the other side of the piston member 54 forms a third force F3 to press the guide 90 toward the other side of the housing 10. Thus, a total force Ftot supplied to the parts positioned between the pressurizing part 80 and the first support member 76 is a positive value obtained by subtracting the first force F1 from the sum of the second and third forces F2 and F3. Therefore, a constant force is transferred from the pressurizing part 80 toward the first support member 76. Therefore, since the parts are pressed against each other by the pre-pressure, it is possible to prevent (or at least reduce) generation of noise or vibration by tolerance between the parts.

That is, the master cylinder 1 of a vehicle brake according to various exemplary embodiments is configured to apply a single-direction load to the assembled parts, even though hydraulic pressure distribution within both chambers based on the sealing member 56 of the piston member 54 is changed in various manners.

The pressurizing part 80 can continuously compensate for a clearance formed by abrasion of the parts when the master cylinder 1 of a vehicle brake is used. Furthermore, the structure in which an axial load caused by the hydraulic pressure within the chamber of the housing 10 is not applied to the pressurizing part 80 can secure a degree of freedom in design and the durability of the pressurizing part 80 to apply a pre-load.

Furthermore, the position of the screw 30 can be corrected so that the screw rotating shaft 34 of the screw 30 becomes coaxial with the rotation center of the motor rotating part 26 and the fixed piston 60. Since the rotatable ball member 72 and the compensation clearance 40 provide a structure capable of performing active axial compensation between the respective parts when the master cylinder 1 of the brake for the vehicle is operated, system efficiency can be improved.

Since the sealing area by the guide 90 is larger than the sealing area by the piston member 54 as illustrated in FIG. 1, a load may be generated toward the right side of the piston member 54 even though hydraulic pressure is formed on the right side of the piston member 54.

That is, a first sealing length A corresponding to a distance between the outside of the moving body 52 and the inner wall surface of the housing 10 is proportional to the area sealed by the piston member 54, and a second sealing length B corresponding to a distance between the outside of the moving body 52 and the outer surface of the guide 90 is proportional to the area sealed by the guide 90. The second sealing length B is larger than the first sealing length A. Therefore, although hydraulic pressure is formed on the right side of the piston member 54, more hydraulic pressure may be applied in a direction facing the guide 90 having a sealing area proportional to the second sealing length B than in a direction facing the piston member 54 having a sealing area proportional to the first sealing length A. Further, since the guide 90 is forced into another structure, and, thus, not fixed, but floats, the guide 90 serves to generate the same load in one direction.

According to various exemplary embodiments, the pressurizing part 80 implemented as an elastic body elastically pressurizes the guide body 92 in the direction that the support part 74 is installed, and, thus, applies a pre-load between the assembled parts. In this manner, tolerance management can be easily performed, and friction and interference between the parts can be reduced. Furthermore, when the master cylinder 1 of a vehicle brake is operated, system efficiency can be improved through pre-load management between the respective parts. Also, the active shaft compensation efficiency between the power transmission shafts can be improved. Furthermore, tolerance of a single part can be reduced to raise a degree of freedom in design. Moreover, durability can be improved and operating noise can be reduced through the pre-load operating condition. Furthermore, the ball member 72 and the compensation clearance 40 can compensate for the coaxiality and right angle degree between the moving piston 50 and the screw 30 that are positioned on the same axis as the rotation center axis of the motor rotating part 26, and, thereby, improve the operation reliability.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A master cylinder of a vehicle brake, comprising:
a housing comprising a port configured to move hydraulic fluid;
a motor connected to the housing and configured to supply rotation power;
a screw rotatably installed in the motor and configured to rotate in response to the rotation power of the motor;
a moving piston engaged with an outside of the screw, the moving piston being configured to move in a longitudinal direction of the housing in response to rotation of the screw;
a guide blocked by the housing and constrained from rotating, the guide being configured to constrain rotation of the moving piston and guide linear movement of the moving piston in the longitudinal direction; and
a pressurizing part installed between the housing and the guide, the pressurizing part being configured to pressurize the guide via an elastic force.

2. The master cylinder of claim 1, wherein the motor comprises:
a fixed part fixed to the housing and configured to change magnetism in response to a supplied power;
a motor rotating part connected to the screw, the motor rotating part being configured to rotate with the screw and rotate according to the change in the magnetism of the fixed part; and
a motor bearing part installed between the fixed part and the motor rotating part, the motor bearing part being configured to reduce friction associated with rotation of the motor rotating part.

3. The master cylinder of claim 2, wherein the motor rotating part comprises:
a rotating frame rotatably installed in the fixed part, a shape of the rotating frame covering an end of the moving piston; and
a rotor installed outside the rotating frame and facing the fixed part, the rotor comprising magnetism.

4. The master cylinder of claim 3, wherein the screw comprises:
a screw body rotatably installed in the rotating frame, the screw comprising a spiral gear formed on the outside of the screw; and
a screw rotating shaft extended from the screw body, the screw rotating shaft being spline-coupled to the rotating frame.

5. The master cylinder of claim 4, wherein a compensation clearance is provided between the rotating frame and the screw rotating shaft.

6. The master cylinder of claim 1, wherein:
the pressurizing part is a plate spring comprising a curved cross-section; and
the pressuring part is configured to pressurize the guide in a direction away from the moving piston.

7. A master cylinder of a vehicle brake, comprising:
a housing comprising a port configured to transmit hydraulic fluid;
a motor connected to the housing and configured to supply rotation power;
a screw rotatably installed in the motor, the screw being configured to rotate in response to the rotation power of the motor;
a ball member connected to a screw rotating shaft of the screw, the ball member comprising a curved surface; and
a support part positioned on opposing sides of the ball member, the support part rotatably supporting the ball member.

8. The master cylinder of claim 7, wherein the support part comprises:
a first support member positioned in the motor, the screw rotating shaft comprising a portion extending through the first support member; and
a second support member installed at a position facing the first support member.

9. The master cylinder of claim 8, wherein the first and second support members are configured to rotate together with the screw rotating shaft.

10. The master cylinder of claim 8, further comprising:
a thrust bearing part installed at a position facing the second support member, the thrust bearing part being configured to reduce friction associated with rotation of the second support member.

* * * * *